Oct. 20, 1953 R. L. LONGINI 2,656,287
PROCESS FOR THE PRECISION EVAPORATION OF ANTIMONY
Filed June 29, 1949
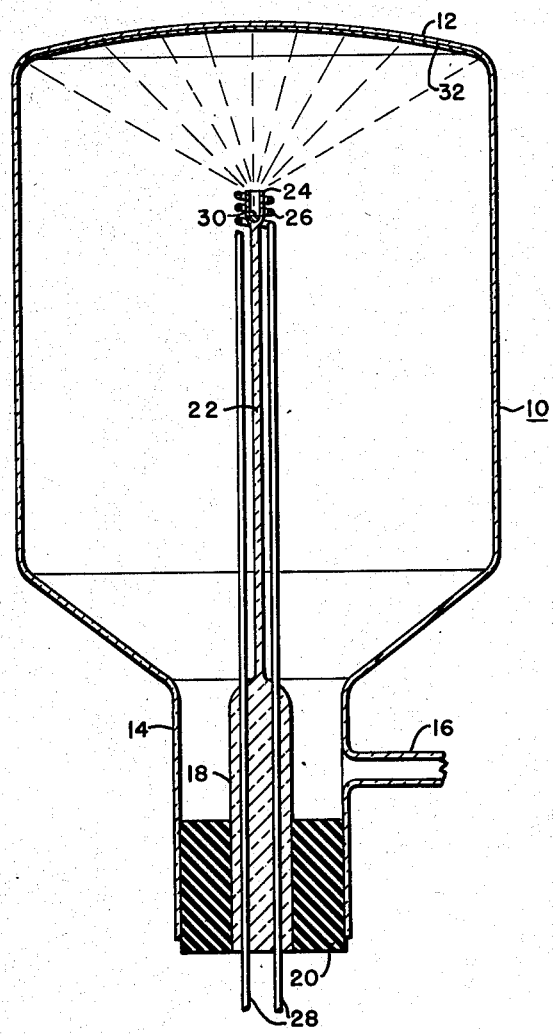
WITNESSES:
INVENTOR
Richard L. Longini.
BY
ATTORNEY Patented Oct. 20, 1953

2,656,287

UNITED STATES PATENT OFFICE 2,656,287

PROCESS FOR THE PRECISION EVAPORATION OF ANTIMONY

Richard L. Longini, Pittsburgh, Pa., assignor to Westinghouse Electric Corporation, East Pittsburgh, Pa., a corporation of Pennsylvania Application June 29, 1949, Serial No. 102,124

2 Claims. (Cl. 117—107)

This invention relates to a process for producing evaporated films or coatings of precise thickness upon the surfaces of members.

It has been discovered that finely divided antimony, that is below 100 mesh fineness, agglomerates so that small portions thereof cannot be subdivided accurately without great inconvenience and labor. For certain purposes, it has been found necessary to weigh out proportions of antimony of the order of from 1 to 10 milligrams with considerable accuracy. The weighing out of quantities of antimony of this size was found to be extremely time consuming and difficult.

The object of this invention is to provide a process for evaporating coatings of precise thickness upon the surfaces of members.

A further object of the invention is to provide compositions embodying antimony and a non-agglomerating metal oxide powder mixture that may be weighed out in minute quantities with considerable accuracy.

Other objects of the invention will in part be obvious and will in part appear hereinafter. For a better understanding of the nature and objects of the invention, reference should be had to the following detailed description and the single figure of the drawing.

It has been discovered that compositions containing an accurately determinable amount of antimony, even in minute quantities of the order of 1 to 10 milligrams, may be prepared by combining a certain type of finely divided antimony with a particular type of finely divided refractory metal oxide. Specifically, antimony is powdered, for example, by ball milling antimony and screening the fine powder so produced from time to time through a predetermined size mesh screen, preferably using a sieve shaker. Several hundred grams of antimony powder, for example, of less than 300 mesh fineness may be so produced. The accumulated sieved powder is then rescreened in the same sieve through which the quantity from the ball mill had previously passed. A small portion of the previously sieved antimony will be found to be retained on the sieve on the second sieving. This quantity of retained antimony may be a gram or less in weight. This double screening procedure will be found to retain on the sieve particles of substantially the same size and uniformity. Under the microscope, these particles have been observed to be closely identical in size, with very few particles noticeably larger or smaller than the overwhelming majority of the particles.

Finely divided refractory metal oxides, preferably metal oxides that have a low vapor pressure, for instance less than 1 mm. of Hg at 1500° C., are similarly double screened through the same sieve, that is, a quantity of the metal oxide powder is passed through a 300 mesh screen, using a standard sieve shaking mechanism, and then the powder is repassed through the screen and it will be found that a small portion of the metal oxide is retained on the screen the second time. This small retained amount is of a high degree of uniformity and the particles will be of a size comparable to the particles of antimony and of a similar degree of uniformity of size. Suitable refractory metal oxides for the purpose of this invention are aluminum oxide, magnesium oxide, zirconium oxide and silica. Either before or after having been screened, the refractory metal oxides are desirably heated in an oven to a temperature of from 1000° C. to 1500° C. to evaporate any volatile impurities.

The relatively small amount, for example, 1 gram, of double sieved antimony powder retained on the sieve after the second sieving is weighed accurately, and to the antimony powder there is then added at least an equal accurately weighed amount of the double sieved refractory metal oxide retained on the sieve after the second sieving. Depending upon the accuracy and other requirements in subsequent operations, the amount of the refractory metal oxide may vary up to as much as 100 times the weight of the antimony. For instance, I have prepared mixtures in which the antimony and refractory metal oxide were in equal parts by weight, other mixtures in which the metal oxide was substantially 10 times the weight of the antimony, and still other mixtures in which the metal oxide was 41 times the weight of the antimony.

After having been weighed, the mixture of powders is thoroughly and intimately mixed together by rolling or shaking, or the like, for prolonged periods of time to insure a highly uniform distribution of the antimony in the metal oxide powder. In this mixture the metal oxide functions as a non-agglomerating agent for the antimony. Thus, a mass of antimony powder alone in an amount of a few milligrams picked up on the end of a flat wire, when observed under a microscope, exhibits marked cohering characteristics, so that when the wire is shaken, the antimony powder falls off in large clumps. The mixture of the antimony powder and metal oxide, as described herein, however, in the same amount flows freely, and slight vibrations or jarring causes individual grains to roll off the wire.

The thoroughly admixed composition of antimony and metal oxide powders may be readily weighed out into portions of the order of one milligram or even less with considerable accuracy. The weighing may be carried out in a few minutes to any reasonably desired degree of precision, for instance 0.1%. The accuracy of the weighing is improved by the fact that the ratio of weight of the antimony to that of the total composition is a small fraction, and the precision of the determination of the weight of the antimony is increased in compositions in which the antimony is progressively smaller. Thus, in a composition containing 49 parts by weight of aluminum oxide and one part of antimony, 5 milligrams of the composition will contain 0.1 milligram of the antimony.

The composition after being thoroughly admixed will be found to be extremely uniform by reason of the fact that nearly all the particles of the metal oxide and antimony are substantially the same size, and therefore the tendency to separate or stratify is greatly diminished. The difference in specific gravity between the refractory metal oxides and the antimony is small, and any separation because of the difference in density is greatly minimized for this reason. The density appears to play a negligible part where the particles are all the same size, and therefore small portions of the thoroughly admixed compositions have substantially the same proportion of antimony to the metal oxide as was present in the entire mass.

The weighed portion of the antimony in the metal oxide powder composition is particularly useful for coating the surfaces of electronic tubes. For example, it has been desirable to provide evaporated antimony films of a thickness of approximately 350 angstroms with a substantial degree of accuracy. A typical tube 10 is shown in the figure of the drawing, wherein the curved surface 12 is to be coated with a precise thickness of the antimony. The tube 10 comprises a constricted neck portion 14 provided with an evacuating outlet 16 which is to be connected to a source of high vacuum. Within the neck 14 there is introduced the holder 18 comprising a long stem 22 terminating in a small cup 24 which is surrounded by a heating element 26 to which electrical current is furnished by the leads 28, passing to the exterior. A suitable stopper 20 is provided for sealing the holder 18 in neck 14 to enable a vacuum to be maintained within the tube 10.

Within the cup 24, there is disposed a weighed portion 30 of the composition comprising antimony and metal oxide as determined to be necessary to provide a suitable coating of antimony on the surface 12. The distance from the cup 24 to the surface 12, as well as the amount of the antimony in the portion 30 within the cup, will determine the thickness of a vaporized coating 32 of antimony disposed on the surface 12. After the holder 18 has been introduced into the tube for sealing the stopper 20, a vacuum is maintained within the interior of the tube 10 to a value of below one micron. Then an electrical current is passed through the leads 28 to the heating element 26 to bring the cup 24 and its contents to a temperature of between 500° C. and 1200° C. It has been found that a temperature of 700° C. is adequate for a sufficiently rapid evaporation of substantially all the antimony from the relatively non-volatile metal oxide in the portion 30. After the antimony has evaporated from the cup 24 and condensed as the film 32 on the surface 12, the vacuum may be broken, and the stopper 20 and holder 18 removed from the tube which may then be processed to its ultimate shape.

The metal oxide in the composition has been found to enable a better coating 32 to be formed since it controls the rate of evaporation of the antimony. Comparisons of films produced by evaporating antimony alone, and antimony in combination with the metallic oxides shows that even though the films are otherwise of identical thickness the quality of the applied antimony film is superior when made from the metal oxide containing composition. This is a further advantage accruing from the combination of the refractory metal oxides and the antimony powders disclosed herein.

Since certain changes in carrying out the above processes and certain modifications thereof may be made without departing from the scope of the invention, it is intended that all matter contained in the above description or shown in the accompanying drawing shall be interpreted as illustrative and not in a limiting sense.

I claim as my invention:

1. In the process of evaporating a predetermined precise thickness of the order of 350 angstroms of metallic antimony on a surface of a member, the steps comprising preparing a non-coherent, highly uniform mixture of a finely divided refractory metal oxide and finely divided metallic antimony, both of a fineness to pass through a sieve of at least 100 meshes to the inch, the sizes of the particles of the metal oxide and the metallic antimony being substantially uniform and closely the same, the weight of the metal oxide being equal to at least the weight of the antimony and functioning as a non-agglomerating agent for the antimony, thereby enabling small quantities of the antimony to be weighed out to a highly accurate degree, weighing out a small portion of the mixture to provide from about 0.1 to 10 milligrams of antimony, placing the weighed portion of the mixture at a predetermined distance from the surface being treated, evacuating the space between the weighed portion and the member, and heating the weighed portion to an elevated temperature below the temperature at which the metal oxide has any significant vapor pressure, to cause all of the antimony to evaporate from the metal oxide portion and the antimony vapors to condense on the surface as a coating of the required thickness.

2. In the process of evaporating a predetermined precise thickness of the order of 350 angstroms of metallic antimony on a surface of a member, the steps comprising preparing a non-coherent, highly uniform, mixture of a finely divided refractory metal oxide and finely divided metallic antimony, both of a fineness to pass through a sieve of at least 100 meshes to the inch, the sizes of the particles of the metal oxide and the metallic antimony being substantially uniform and closely the same, the weight of the metal oxide being equal to at least the weight of the antimony and functioning as a non-agglomerating agent for the antimony, thereby enabling small quantities of the antimony to be weighed out to a highly accurate degree, weighing out a small portion of the mixture to provide from 0.1 to 10 milligrams of antimony, placing the weighed portion of the mixture at a predetermined distance from the surface being treated, evacuating the space between the weighed portion and the member, and heating the weighed portion to a temperature of between 500° C. and 1200° C., to cause all of the antimony to evaporate from the metal oxide portion and the antimony vapors to condense on the surface as a coating of the required thickness.

RICHARD L. LONGINI.

References Cited in the file of this patent

UNITED STATES PATENTS

| Number | Name | Date |
|---|---|---|
| 1,505,343 | Heath | Aug. 19, 1924 |
| 1,541,744 | Wiseman | June 9, 1925 |
| 2,079,784 | Williams | May 11, 1937 |
| 2,219,005 | Daeves et al. | Oct. 22, 1940 |
| 2,242,644 | De Boer | May 20, 1941 |
| 2,363,781 | Ferguson | Nov. 28, 1944 |
| 2,436,814 | Leitch | Mar. 2, 1948 |
| 2,463,791 | Morgan | Mar. 8, 1949 |

OTHER REFERENCES

Husa, "Pharmaceutical Dispensing," 3rd ed., pages 12–14.